US007999826B2

(12) United States Patent
Mawatari et al.

(10) Patent No.: US 7,999,826 B2
(45) Date of Patent: Aug. 16, 2011

(54) COLOR CONVERSION DEVICE, COLOR CONVERSION METHOD, COLOR CONVERSION PROGRAM, RECORDING MEDIUM RECORDING COLOR CONVERSION PROGRAM, IMAGE PROCESSING DEVICE, AND IMAGE DISPLAY DEVICE

(75) Inventors: Satoko Mawatari, Suwa (JP); Hidekuni Moriya, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 970 days.

(21) Appl. No.: 11/875,440

(22) Filed: Oct. 19, 2007

(65) Prior Publication Data

US 2008/0186328 A1 Aug. 7, 2008

(30) Foreign Application Priority Data

Nov. 27, 2006 (JP) ................. 2006-318065

(51) Int. Cl.
*G09G 5/02* (2006.01)
(52) U.S. Cl. ......... 345/600; 345/591; 345/593; 345/604
(58) Field of Classification Search .................. 345/600, 345/591, 593, 604
See application file for complete search history.

(56) References Cited

U.S. PATENT DOCUMENTS

| 5,363,218 | A | * | 11/1994 | Hoshino | 358/518 |
|---|---|---|---|---|---|
| 5,596,428 | A | * | 1/1997 | Tytgat et al. | 358/518 |
| 5,719,956 | A | * | 2/1998 | Ogatsu et al. | 382/167 |
| 5,724,442 | A | * | 3/1998 | Ogatsu et al. | 382/167 |
| 5,742,296 | A | * | 4/1998 | Yamada et al. | 345/604 |
| 5,909,291 | A | * | 6/1999 | Myers et al. | 358/523 |
| 5,937,089 | A | * | 8/1999 | Kobayashi | 382/167 |
| 6,130,675 | A | * | 10/2000 | Murai et al. | 345/600 |
| 6,141,431 | A | * | 10/2000 | Munetsugu et al. | 382/100 |
| 6,360,008 | B1 | * | 3/2002 | Suzuki et al. | 382/167 |
| 6,373,595 | B1 | * | 4/2002 | Semba et al. | 358/1.9 |
| 6,388,674 | B1 | * | 5/2002 | Ito et al. | 345/590 |
| 6,611,356 | B1 | * | 8/2003 | Shimizu et al. | 358/1.9 |
| 6,724,507 | B1 | * | 4/2004 | Ikegami et al. | 358/518 |
| 7,116,441 | B1 | * | 10/2006 | Matsuoka | 358/1.9 |
| 7,230,737 | B1 | * | 6/2007 | Ohga | 358/1.9 |
| 2002/0000993 | A1 | * | 1/2002 | Deishi et al. | 345/590 |
| 2003/0072015 | A1 | * | 4/2003 | Fujino | 358/1.9 |
| 2003/0160801 | A1 | * | 8/2003 | Butler | 345/604 |
| 2004/0013958 | A1 | * | 1/2004 | Ayaki et al. | 430/45 |
| 2004/0056867 | A1 | * | 3/2004 | Cui et al. | 345/590 |
| 2004/0091150 | A1 | * | 5/2004 | Kuwahara et al. | 382/167 |
| 2004/0263879 | A1 | * | 12/2004 | Ito et al. | 358/1.9 |
| 2005/0052671 | A1 | * | 3/2005 | Nishikawa | 358/1.9 |

(Continued)

FOREIGN PATENT DOCUMENTS

JP   A 2000-338950   12/2000

(Continued)

*Primary Examiner* — Xiao M Wu
*Assistant Examiner* — David T Welch
(74) *Attorney, Agent, or Firm* — Oliff & Berridge, PLC

(57) ABSTRACT

A color conversion device that color-converts colors of input image data into colors used in a display unit for displaying images using at least white includes: a ratio calculating unit that calculates a lightness ratio and a saturation ratio between a color reproduction range in the standard color space and a color reproduction range in colors used by the display unit in L*a*b* space at least when a color outside of the color reproduction range in colors used by the display unit is calculated; and a color compressing unit that performs color compression on the image data based on the ratios calculated by the ratio calculating unit.

6 Claims, 17 Drawing Sheets

U.S. PATENT DOCUMENTS

| | | | |
|---|---|---|---|
| 2005/0094871 A1* | 5/2005 | Berns et al. | 382/162 |
| 2005/0140996 A1* | 6/2005 | Horiuchi et al. | 358/1.9 |
| 2005/0200646 A1* | 9/2005 | Deer et al. | 347/20 |
| 2005/0264837 A1* | 12/2005 | Shimada | 358/1.9 |
| 2006/0170939 A1* | 8/2006 | Misumi | 358/1.9 |
| 2007/0003136 A1* | 1/2007 | Shimbaru | 382/167 |
| 2007/0030499 A1* | 2/2007 | Hori | 358/1.9 |
| 2007/0035754 A1* | 2/2007 | Hori et al. | 358/1.9 |
| 2007/0053023 A1* | 3/2007 | Suzuki et al. | 358/518 |
| 2007/0291312 A1* | 12/2007 | Kaneko et al. | 358/2.1 |
| 2009/0040564 A1* | 2/2009 | Granger | 358/2.1 |

FOREIGN PATENT DOCUMENTS

JP     A 2003-295812     10/2003

* cited by examiner

| | RED | | | GREEN | | | BLUE | | | WHITE | | | WHITE (ALL) | | |
|---|---|---|---|---|---|---|---|---|---|---|---|---|---|---|---|
| | X | Y | Z | X | Y | Z | X | Y | Z | X | Y | Z | X | Y | Z |
| | 183.58 | 94.66 | 15.50 | 188.64 | 365.46 | 40.88 | 82.45 | 34.82 | 403.16 | 596.08 | 639.87 | 582.77 | 1050.7 | 1134.8 | 1042.3 |
| AFTER NORMARI-ZATION | 0.160824 | 0.081747 | 0.009353 | 0.165326 | 0.322766 | 0.031941 | 0.070815 | 0.028483 | 0.354388 | 0.52797 | 0.567004 | 0.514253 | — | — | — |

FIG.5A

RGB → XYZ CONVERSION MATRIX

| 0.160824 | 0.1653264 | 0.070815 | 0.52797 |
|---|---|---|---|
| 0.081747 | 0.3227661 | 0.028483 | 0.567004 |
| 0.009353 | 0.031941 | 0.354388 | 0.514253 |

FIG.5B

| COLOR SPACE OF TARGET | | | | CONVERSION INTO XYZ | | | L*a*b* CONVERSION | | |
|---|---|---|---|---|---|---|---|---|---|
| G.No | R | G | B | X | Y | Z | L* | a* | b* |
| 0 | 0 | 0 | 0 | 0.00 | 0.00 | 0.00 | 0.0 | 0.0 | 0.0 |
| 1 | 0 | 0 | 64 | 0.08 | 0.03 | 0.39 | 20.9 | 59.4 | -87.8 |
| 2 | 0 | 0 | 128 | 0.15 | 0.06 | 0.79 | 30.4 | 74.8 | -110.6 |
| 3 | 0 | 64 | 0 | 0.18 | 0.36 | 0.05 | 66.6 | -67.2 | 65.1 |
| 4 | 0 | 64 | 64 | 0.26 | 0.39 | 0.45 | 69.0 | -40.7 | -11.3 |
| 5 | 0 | 64 | 128 | 0.33 | 0.43 | 0.84 | 71.2 | -20.5 | -44.5 |
| 6 | 0 | 128 | 0 | 0.36 | 0.72 | 0.11 | 88.1 | -84.6 | 82.0 |
| 7 | 0 | 128 | 64 | 0.43 | 0.75 | 0.50 | 89.6 | -66.7 | 18.3 |
| 8 | 0 | 128 | 128 | 0.51 | 0.79 | 0.89 | 91.1 | -51.3 | -14.3 |
| 9 | 64 | 0 | 0 | 0.21 | 0.11 | 0.01 | 39.1 | 66.3 | 53.8 |
| 10 | 64 | 0 | 64 | 0.28 | 0.14 | 0.40 | 44.1 | 78.3 | -48.7 |
| 11 | 64 | 0 | 128 | 0.36 | 0.17 | 0.80 | 48.4 | 87.8 | -80.3 |
| 12 | 64 | 64 | 0 | 0.39 | 0.47 | 0.06 | 74.1 | -14.7 | 74.2 |
| 13 | 64 | 64 | 64 | 0.46 | 0.50 | 0.45 | 76.1 | 0.0 | 0.0 |
| 14 | 64 | 64 | 128 | 0.54 | 0.53 | 0.85 | 78.0 | 12.6 | -33.4 |
| 15 | 64 | 128 | 0 | 0.56 | 0.83 | 0.11 | 93.0 | -45.7 | 88.1 |
| 16 | 64 | 128 | 64 | 0.64 | 0.86 | 0.51 | 94.4 | -33.2 | 25.6 |
| 17 | 64 | 128 | 128 | 0.72 | 0.89 | 0.90 | 95.7 | -22.0 | -6.8 |
| 18 | 128 | 0 | 0 | 0.41 | 0.21 | 0.02 | 53.4 | 83.5 | 67.8 |
| 19 | 128 | 0 | 64 | 0.49 | 0.25 | 0.41 | 56.7 | 91.6 | -28.0 |
| 20 | 128 | 0 | 128 | 0.57 | 0.28 | 0.80 | 59.7 | 98.7 | -61.4 |
| 21 | 128 | 64 | 0 | 0.59 | 0.57 | 0.07 | 80.5 | 15.3 | 81.9 |
| 22 | 128 | 64 | 64 | 0.67 | 0.61 | 0.46 | 82.2 | 25.6 | 9.7 |
| 23 | 128 | 64 | 128 | 0.75 | 0.64 | 0.86 | 83.9 | 34.9 | -23.8 |
| 24 | 128 | 128 | 0 | 0.77 | 0.94 | 0.12 | 97.5 | -18.5 | 93.5 |
| 25 | 128 | 128 | 64 | 0.85 | 0.97 | 0.52 | 98.7 | -8.9 | 32.4 |
| 26 | 128 | 128 | 128 | 0.92 | 1.00 | 0.91 | 100.0 | 0.0 | 0.0 |

FIG. 6

| Number | Type of LUT point |
|---|---|
| I | Point as apex of color reproduction range |
| II | Point forming intermediate part |
| III | Point on gray axis |
| IV | Point in high lightness region |

FIG.9A

COMPRESSION RATIOS WITH RESPECT TO EACH PRIMARY COLOR

| | Number | R | G | B | C | M | Y |
|---|---|---|---|---|---|---|---|
| L* | I, II | 0.64 | 0.72 | 0.64 | 0.68 | 0.64 | 0.68 |
| | III, IV | 0.64 | 0.72 | 0.64 | 0.68 | 0.64 | 0.68 |
| a* b* | I, II, IV | 0.70 | 0.80 | 0.78 | 0.79 | 0.74 | 0.75 |
| | III | 0.70 | 0.80 | 0.78 | 0.79 | 0.74 | 0.75 |

FIG.9B

**L*a*b* CONVERSION**

| G.No | L* | a* | b* |
|---|---|---|---|
| 0 | 0.0 | 0.0 | 0.0 |
| 1 | 20.9 | 59.4 | -87.8 |
| 2 | 30.4 | 74.8 | -110.6 |
| 3 | 66.6 | -67.2 | 65.1 |
| 4 | 69.0 | -40.7 | -11.3 |
| 5 | 71.2 | -20.5 | -44.5 |
| 6 | 88.1 | -84.6 | 82.0 |
| 7 | 89.6 | -66.7 | 18.3 |
| 8 | 91.1 | -51.3 | -14.3 |
| 9 | 39.1 | 66.3 | 53.8 |
| 10 | 44.1 | 78.3 | -48.7 |
| 11 | 48.4 | 87.8 | -80.3 |
| 12 | 74.1 | -14.7 | 74.2 |
| 13 | 76.1 | 0.0 | 0.0 |
| 14 | 78.0 | 12.6 | -33.4 |
| 15 | 93.0 | -45.7 | 88.1 |
| 16 | 94.4 | -33.2 | 25.6 |
| 17 | 95.7 | -22.0 | -6.8 |
| 18 | 53.4 | 83.5 | 67.8 |
| 19 | 56.7 | 91.6 | -28.0 |
| 20 | 59.7 | 98.7 | -61.4 |
| 21 | 80.5 | 15.3 | 81.9 |
| 22 | 82.2 | 25.6 | 9.7 |
| 23 | 83.9 | 34.9 | -23.8 |
| 24 | 97.5 | -18.5 | 93.5 |
| 25 | 98.7 | -8.9 | 32.4 |
| 26 | 100.0 | 0.0 | 0.0 |

| Number | Color component | Compression ratio L* | Compression ratio a* b* |
|---|---|---|---|
| III | Black | 1.00 | 1.00 |
| II | B | 0.64 | 0.78 |
| I | B | 0.64 | 0.78 |
| II | G | 0.72 | 0.80 |
| II | C | 0.68 | 0.79 |
| I | C+B | 0.66 | 0.78 |
| I | G | 0.72 | 0.80 |
| I | G+C | 0.70 | 0.79 |
| I | C | 0.68 | 0.79 |
| II | R | 0.64 | 0.70 |
| II | M | 0.64 | 0.74 |
| I | B+M | 0.64 | 0.76 |
| II | Y | 0.68 | 0.75 |
| III | Gray | 1.00 | 1.00 |
| IV | B | 1.00 | 0.78 |
| I | Y+G | 0.70 | 0.78 |
| IV | G | 1.00 | 0.80 |
| IV | C | 1.00 | 0.79 |
| I | R | 0.64 | 0.70 |
| I | M+R | 0.64 | 0.72 |
| I | M | 0.64 | 0.74 |
| I | R+Y | 0.66 | 0.73 |
| IV | R | 1.00 | 0.70 |
| IV | M | 1.00 | 0.74 |
| I | Y | 0.68 | 0.75 |
| IV | Y | 1.00 | 0.75 |
| III | White | 1.00 | 1.00 |

COLOR COMPRESSION

| L* | a* | b* |
|---|---|---|
| 0.0 | 0.0 | 0.0 |
| 13.3 | 46.2 | -68.2 |
| 19.4 | 58.2 | -86.0 |
| 48.1 | -53.8 | 52.1 |
| 46.9 | -32.1 | -8.9 |
| 46.9 | -16.1 | -34.8 |
| 63.6 | -67.8 | 65.7 |
| 62.8 | -53.0 | 14.5 |
| 61.9 | -40.5 | -11.3 |
| 25.1 | 46.6 | 37.9 |
| 28.3 | 58.0 | -36.1 |
| 31.0 | 66.6 | -60.9 |
| 50.6 | -11.0 | 55.8 |
| 76.1 | 0.0 | 0.0 |
| 78.0 | 9.8 | -26.0 |
| 65.3 | -35.5 | 68.4 |
| 94.4 | -26.6 | 20.5 |
| 95.7 | -17.4 | -5.4 |
| 34.3 | 58.8 | 47.7 |
| 36.4 | 66.1 | -20.2 |
| 38.3 | 73.1 | -45.5 |
| 53.3 | 11.1 | 59.6 |
| 82.2 | 18.0 | 6.8 |
| 83.9 | 25.8 | -17.6 |
| 66.5 | -13.9 | 70.4 |
| 98.7 | -6.7 | 24.3 |
| 100.0 | 0.0 | 0.0 |

| COLOR COMPRESSION | | | | |
|---|---|---|---|---|
| G.No | L* | a* | b* |
| 0 | 0.0 | 0.0 | 0.0 |
| 1 | 13.3 | 46.2 | -68.2 |
| 2 | 19.4 | 58.2 | -86.0 |
| 3 | 48.1 | -53.8 | 52.1 |
| 4 | 46.9 | -32.1 | -8.9 |
| 5 | 46.9 | -16.1 | -34.8 |
| 6 | 63.6 | -67.8 | 65.7 |
| 7 | 62.8 | -53.0 | 14.5 |
| 8 | 61.9 | -40.5 | -11.3 |
| 9 | 25.1 | 46.6 | 37.9 |
| 10 | 28.3 | 58.0 | -36.1 |
| 11 | 31.0 | 66.6 | -60.9 |
| 12 | 50.6 | -11.0 | 55.8 |
| 13 | 76.1 | 0.0 | 0.0 |
| 14 | 78.0 | 9.8 | -26.0 |
| 15 | 65.3 | -35.5 | 68.4 |
| 16 | 94.4 | -26.6 | 20.5 |
| 17 | 95.7 | -17.4 | -5.4 |
| 18 | 34.3 | 58.8 | 47.7 |
| 19 | 36.4 | 66.1 | -20.2 |
| 20 | 38.3 | 73.1 | -45.5 |
| 21 | 53.3 | 11.1 | 59.6 |
| 22 | 82.2 | 18.0 | 6.8 |
| 23 | 83.9 | 25.8 | -17.6 |
| 24 | 66.5 | -13.9 | 70.4 |
| 25 | 98.7 | -6.7 | 24.3 |
| 26 | 100.0 | 0.0 | 0.0 |

| XYZ CONVERSION | | |
|---|---|---|
| X | Y | Z |
| 0.00 | 0.00 | 0.00 |
| 0.04 | 0.02 | 0.19 |
| 0.07 | 0.03 | 0.36 |
| 0.08 | 0.17 | 0.02 |
| 0.10 | 0.16 | 0.18 |
| 0.12 | 0.16 | 0.33 |
| 0.15 | 0.32 | 0.04 |
| 0.17 | 0.31 | 0.20 |
| 0.19 | 0.30 | 0.35 |
| 0.08 | 0.04 | 0.00 |
| 0.11 | 0.06 | 0.16 |
| 0.14 | 0.07 | 0.32 |
| 0.16 | 0.19 | 0.02 |
| 0.46 | 0.50 | 0.45 |
| 0.53 | 0.53 | 0.76 |
| 0.23 | 0.34 | 0.04 |
| 0.67 | 0.86 | 0.56 |
| 0.74 | 0.89 | 0.88 |
| 0.16 | 0.08 | 0.01 |
| 0.18 | 0.09 | 0.15 |
| 0.21 | 0.10 | 0.31 |
| 0.22 | 0.21 | 0.02 |
| 0.64 | 0.61 | 0.49 |
| 0.70 | 0.64 | 0.78 |
| 0.30 | 0.36 | 0.04 |
| 0.86 | 0.97 | 0.59 |
| 0.92 | 1.00 | 0.91 |

FIG.16A
$M_0$ n=0 R=0

| 0.000 | 0.000 | 0.000 |
| -9.994 | 8.084 | 1.347 |
| -7.933 | 3.656 | 4.113 |
| 6.087 | -3.022 | -0.974 |

$M_{RGBC0}$

| 0 | 0 | 0 | 0 |
| 0 | 1 | 1 | 1 |
| 0 | 0 | 0 | 1 |
| 0 | 0 | 1 | 0 |

FIG.16B
$M_1$ n=1 R=0

| 0.000 | 0.000 | 0.000 |
| -9.994 | 8.084 | 1.347 |
| -7.933 | 3.656 | 4.113 |
| 6.087 | -3.022 | -0.974 |

$M_{RGBC1}$

| 0 | 0 | 0 | 0 |
| 0 | 0 | 1 | 0 |
| 0 | 1 | 1 | 1 |
| 0 | 0 | 0 | 1 |

FIG.16C
$M_2$ n=2 G=0

| 10.702 | -8.657 | -1.443 |
| 0.000 | 0.000 | 0.000 |
| 2.110 | -4.468 | 2.759 |
| -1.649 | 3.236 | 0.069 |

$M_{RGBC2}$

| 0 | 0 | 0 | 1 |
| 0 | 0 | 0 | 0 |
| 0 | 1 | 1 | 1 |
| 0 | 0 | 1 | 0 |

FIG.16D
$M_3$ n=3 G=0

| 10.702 | -8.657 | -1.443 |
| 0.000 | 0.000 | 0.000 |
| 2.110 | -4.468 | 2.759 |
| -1.649 | 3.236 | 0.069 |

$M_{RGBC3}$

| 0 | 1 | 1 | 1 |
| 0 | 0 | 0 | 0 |
| 0 | 0 | 0 | 1 |
| 0 | 0 | 1 | 0 |

FIG.16E
$M_4$ n=4 B=0

| 8.453 | -3.896 | -4.383 |
| -2.100 | 4.446 | -2.746 |
| 0.000 | 0.000 | 0.000 |
| -0.023 | -0.205 | 2.195 |

$M_{RGBC4}$

| 0 | 0 | 1 | 0 |
| 0 | 1 | 1 | 1 |
| 0 | 0 | 0 | 0 |
| 0 | 0 | 0 | 1 |

FIG.16F
$M_5$ n=5 B=0

| 8.453 | -3.896 | -4.383 |
| -2.100 | 4.446 | -2.746 |
| 0.000 | 0.000 | 0.000 |
| -0.023 | -0.205 | 2.195 |

$M_{RGBC5}$

| 0 | 1 | 1 | 1 |
| 0 | 0 | 1 | 0 |
| 0 | 0 | 0 | 0 |
| 0 | 0 | 0 | 1 |

FIG.16G
$M_6$ n=6 R=W

| 3.533 | -1.754 | -0.565 |
| -6.694 | 6.446 | 0.820 |
| -4.617 | 2.010 | 3.583 |
| 3.533 | -1.754 | -0.565 |

$M_{RGBC6}$

| 0 | 1 | 1 | 1 |
| 0 | 0 | 1 | 0 |
| 0 | 0 | 0 | 1 |
| 0 | 1 | 1 | 1 |

FIG.16H
$M_7$ n=7 G=W

| 9.707 | -6.704 | -1.401 |
| -0.929 | 1.824 | 0.039 |
| 1.176 | -2.634 | 2.798 |
| -0.929 | 1.824 | 0.039 |

$M_{RGBC7}$

| 0 | 0 | 1 | 0 |
| 0 | 1 | 1 | 1 |
| 0 | 0 | 0 | 1 |
| 0 | 1 | 1 | 1 |

FIG.16I
$M_8$ n=8 B=W

| 8.439 | -4.020 | -3.062 |
| -2.113 | 4.330 | -1.512 |
| -0.013 | -0.116 | 1.240 |
| -0.013 | -0.116 | 1.240 |

$M_{RGBC8}$

| 0 | 0 | 1 | 0 |
| 0 | 0 | 0 | 1 |
| 0 | 1 | 1 | 1 |
| 0 | 1 | 1 | 1 |

| R | G | B | W | Conversion Matrix |
|---|---|---|---|---|
| 0 | 0 | 0 | 0 | $M_6$ |
| 0 | 0 | 64 | 0 | $M_2$ |
| 0 | 0 | 128 | 0 | $M_2$ |
| 0 | 64 | 0 | 0 | $M_4$ |
| 0 | 64 | 64 | 0 | $M_0$ |
| 0 | 64 | 128 | 0 | $M_0$ |
| 0 | 128 | 0 | 0 | $M_4$ |
| 0 | 128 | 64 | 0 | $M_0$ |
| 0 | 128 | 128 | 0 | $M_0$ |
| 64 | 0 | 0 | 0 | $M_5$ |
| 64 | 0 | 64 | 0 | $M_2$ |
| 64 | 0 | 128 | 0 | $M_2$ |
| 64 | 64 | 0 | 0 | $M_4$ |
| 64 | 64 | 64 | 64 | $M_6$ |
| 0 | 0 | 128 | 128 | $M_2$ |
| 64 | 128 | 0 | 0 | $M_4$ |
| 0 | 128 | 0 | 128 | $M_4$ |
| 0 | 128 | 128 | 128 | $M_0$ |
| 128 | 0 | 0 | 0 | $M_5$ |
| 128 | 0 | 64 | 0 | $M_2$ |
| 128 | 0 | 128 | 0 | $M_2$ |
| 128 | 64 | 0 | 0 | $M_4$ |
| 128 | 0 | 0 | 128 | $M_5$ |
| 128 | 0 | 128 | 128 | $M_2$ |
| 128 | 128 | 0 | 0 | $M_4$ |
| 128 | 128 | 0 | 128 | $M_4$ |
| 128 | 128 | 128 | 128 | $M_6$ |

FIG.17

| XYZ CONVERSION | | | | | AFTER COLOR CONVERSION | | | |
|---|---|---|---|---|---|---|---|---|
| G.No | X | Y | Z | Conversion Matrix | R | G | B | W |
| 0 | 0.00 | 0.00 | 0.00 | M7 | 0 | 0 | 0 | 0 |
| 1 | 0.04 | 0.02 | 0.19 | M3 | −1 | 0 | 68 | 0 |
| 2 | 0.07 | 0.03 | 0.36 | M3 | −3 | 0 | 130 | 0 |
| 3 | 0.08 | 0.17 | 0.02 | M5 | −9 | 66 | 0 | 2 |
| 4 | 0.10 | 0.16 | 0.18 | M1 | 0 | 67 | 69 | −6 |
| 5 | 0.12 | 0.16 | 0.33 | M1 | 0 | 66 | 126 | −8 |
| 6 | 0.15 | 0.32 | 0.04 | M5 | −17 | 128 | 0 | 3 |
| 7 | 0.17 | 0.31 | 0.20 | M1 | 0 | 136 | 77 | −11 |
| 8 | 0.19 | 0.30 | 0.35 | M1 | 0 | 130 | 133 | −12 |
| 9 | 0.08 | 0.04 | 0.00 | M6 | 66 | 2 | 0 | −1 |
| 10 | 0.11 | 0.06 | 0.16 | M3 | 65 | 0 | 56 | 0 |
| 11 | 0.14 | 0.07 | 0.32 | M3 | 64 | 0 | 116 | 0 |
| 12 | 0.16 | 0.19 | 0.02 | M5 | 61 | 58 | 0 | 1 |
| 13 | 0.46 | 0.50 | 0.45 | M7 | 64 | 64 | 64 | 64 |
| 14 | 0.53 | 0.53 | 0.76 | M3 | −5 | 0 | 106 | 116 |
| 15 | 0.23 | 0.34 | 0.04 | M5 | 55 | 119 | 0 | 2 |
| 16 | 0.67 | 0.86 | 0.56 | M5 | −16 | 114 | 0 | 132 |
| 17 | 0.74 | 0.89 | 0.88 | M1 | 0 | 130 | 131 | 121 |
| 18 | 0.16 | 0.08 | 0.01 | M6 | 123 | 2 | 0 | −1 |
| 19 | 0.18 | 0.09 | 0.15 | M3 | 122 | 0 | 51 | 1 |
| 20 | 0.21 | 0.10 | 0.31 | M3 | 123 | 0 | 107 | 0 |
| 21 | 0.22 | 0.21 | 0.02 | M5 | 118 | 54 | 0 | 1 |
| 22 | 0.64 | 0.61 | 0.49 | M6 | 112 | 3 | 0 | 119 |
| 23 | 0.70 | 0.64 | 0.78 | M3 | 112 | 0 | 100 | 123 |
| 24 | 0.30 | 0.36 | 0.04 | M5 | 116 | 111 | 0 | 2 |
| 25 | 0.86 | 0.97 | 0.59 | M5 | 114 | 111 | 0 | 139 |
| 26 | 0.92 | 1.00 | 0.91 | M7 | 128 | 128 | 128 | 128 |

COLOR CONVERSION DEVICE, COLOR CONVERSION METHOD, COLOR CONVERSION PROGRAM, RECORDING MEDIUM RECORDING COLOR CONVERSION PROGRAM, IMAGE PROCESSING DEVICE, AND IMAGE DISPLAY DEVICE

BACKGROUND

1. Technical Field

The present invention relates to a color conversion technology of color-converting colors of input image data into colors used by a display unit for image display.

2. Related Art

An image display device capable of displaying images using four or more colors has been known (hereinafter, basic colors representing image data are also referred to as "primary colors"). In the image display device, input image data is in three primary colors, and the image data is color-converted in multiple primary colors (e.g., four primary colors). For example, JP-A-2003-295812 discloses a technology for improving brightness of output videos by adding W (white) to R (red), G (green), and B (blue). In the technology, the scaling factor is obtained using values of RGB, and the RGB data is scaled and separated into RGBW data. Further, all colors are converted using the primary colors of the display as primary colors after color conversion without change. Furthermore, JP-A-2000-38950 discloses a technology of dividing a color reproduction range in a display device using multiple primary colors into plural pyramid regions and calculating primary colors RGBC in the respective regions.

However, according to the method disclosed in JP-A-2003-295812, the area of a color filter is smaller in the case of using four primary colors of RGBW than in the case of using the three primary colors, and the colorfulness may be lower. Further, the saturation is lower because of white added after conversion, and the entire saturation in the output video tends to be lower.

Further, according to the method disclosed in JP-A-2000-338950, when the multi-primary color display can encompass only a little of the standard color space in RGB, a color outside of the color reproduction range may not be appropriately reproduced on the display. Specifically, a method of color-range compression of a color outside of the color reproduction range is disclosed in the document. However, the color overlapping may not be appropriately reduced because of mapping on the surface, and further, the color outside of the color reproduction range may not be appropriately reproduced because the result of mapping is greatly affected by the surface and the goal.

SUMMARY

According to some aspects of the invention, a color conversion device, a color conversion method, a color conversion program, a recording medium recording color conversion program, and an image processing device capable of appropriate color reproduction by performing appropriate color compression when colors are color-converted into colors of a display unit using white, and an image display device are provided.

According to an aspect of the invention, there is provided a color conversion device that color-converts colors of input image data into colors used in a display unit for displaying images using at least white, including: a ratio calculating unit that calculates a lightness ratio and a saturation ratio between a color reproduction range in the standard color space and a color reproduction range in colors used by the display unit in L*a*b* space at least when a color outside of the color reproduction range in colors used by the display unit is calculated, and a color compressing unit that performs color compression on the image data based on the ratios calculated by the ratio calculating unit.

The color conversion device is preferably used for color conversion of colors of input image data into colors use in a display unit for displaying images using at least white. Specifically, the ratio calculating unit calculates a lightness ratio and a saturation ratio between a color reproduction range in the standard color space and a color reproduction range in colors used by the display unit in L*a*b* space at least when a color outside of the color reproduction range in colors used by the display unit is calculated. The color compressing unit performs color compression on the image data based on the ratios calculated by the ratio calculating unit. According to the color conversion device, even when the color space in the device may not encompass most of the standard color space, color compression can be appropriately performed without color overlapping. For example, the colors outside of the color reproduction range can be appropriately reproduced. Further, since the color compression is performed in the L*a*b* space, the compression suitable for human visual perception can be performed.

It is preferable that the color compressing unit color-compresses data representing lightness in the image data based on the lightness ratio and color-compresses data representing saturation in the image data based on the saturation ratio. That is, the color compressing unit separately color-compresses the data representing lightness and the data representing saturation based on the lightness ratio and the saturation ratio.

It is preferable that the color compressing unit color-compresses only the data representing saturation and does not color-compresses the data representing lightness for colors in a high lightness region, does not color-compresses either the data representing lightness or the data representing saturation for colors on a gray axis, and color-compresses both the data representing lightness and the data representing saturation for colors other than the colors in the high lightness region or the colors in the gray axis. Thereby, inappropriate color compression can be suppressed and colors can be appropriately reproduced.

It is preferable that the high lightness region is defined based on a point at which the saturation starts to be relatively lower in a high lightness direction other than a point at which the saturation is the highest in each hue in the L*a*b* space.

In the color conversion device, preferably, the color compressing unit can perform the color compression by multiplying the data representing lightness by the lightness ratio as a coefficient and multiplying the data representing saturation by the saturation ratio as a coefficient.

More preferably, the device further includes a converting-unit that sets a conversion matrix with respect to each color reproduction range divided into plural regions in the display unit, determines in which region of the plural regions the image data after color compression by the color compressing unit is, and converts the image data based on the conversion matrix set for the determined region.

In a preferable example, the display unit provides display using Red, Green, Blue, and White.

According to another aspect of the invention, there is provided a color conversion method that color-converts colors of input image data into colors used in a display unit for displaying images using at least white, including: calculating a lightness ratio and a saturation ratio between a color reproduction range in the standard color space and a color reproduction range in colors used by the display unit in L*a*b* space at least when a color outside of the color reproduction range in colors used by the display unit is calculated; and performing color compression on the image data based on the ratios calculated by the ratio calculating unit.

According to a further aspect of the invention, there is provided a color conversion program that color-converts colors of input image data into colors used in a display unit for displaying images using at least white, which allows a computer to function as: a ratio calculating unit that calculates a lightness ratio and a saturation ratio between a color reproduction range in the standard color space and a color reproduction range in colors used by the display unit in L*a*b* space at least when a color outside of the color reproduction range in colors used by the display unit is calculated; and a color compressing unit that performs color compression on the image data based on the ratios calculated by the ratio calculating unit.

Even when the color space in the device may not encompass most of the standard color space, color compression can be appropriately performed without color overlapping by executing the above described color conversion method and color conversion program.

As a recording medium that records the color conversion program, various computer-readable media such as flexible disks, CD-ROMs, and IC cards can be used.

According to a still further aspect of the invention, there is provided an image processing device that color-converts colors of input image data into colors used in a display unit for displaying images using at least white, including: a ratio calculating unit that calculates a lightness ratio and a saturation ratio between a color reproduction range in the standard color space and a color reproduction range in colors used by the display unit in L*a*b* space at least when a color outside of the color reproduction range in colors used by the display unit is calculated; a color compressing unit that performs color compression on the image data based on the ratios calculated by the ratio calculating unit; and an image processing unit that performs image processing based on the image data after processing by the color compressing unit. According to the image processing device, image data in which color compression is appropriately performed can be created without generating color overlapping and image processing can be performed based on the image data.

The image processing device can be preferably applied to an image display device including a display unit that displays the image data.

BRIEF DESCRIPTION OF THE DRAWINGS

The invention will be described with reference to the accompanying drawings, wherein like numbers reference like elements.

FIGS. 5A and 5B are charts for explanation of a method of obtaining an RGB→XYZ conversion matrix.

FIG. 6 shows an example of results from RGB→XYZ→L*a*b* conversion processing.

FIGS. 9A and 9B show compression ratios with respect to each primary color used when the color compression processing is executed.

FIG. 16 shows specific examples of conversion matrixes.

FIG. 17 shows a chart in which points corresponding to LUT are associated with conversion matrixes.

DESCRIPTION OF EXEMPLARY EMBODIMENTS

Hereinafter, a preferred embodiment of the invention will be described with reference to the drawings.

Overall Configuration

Figure 1:
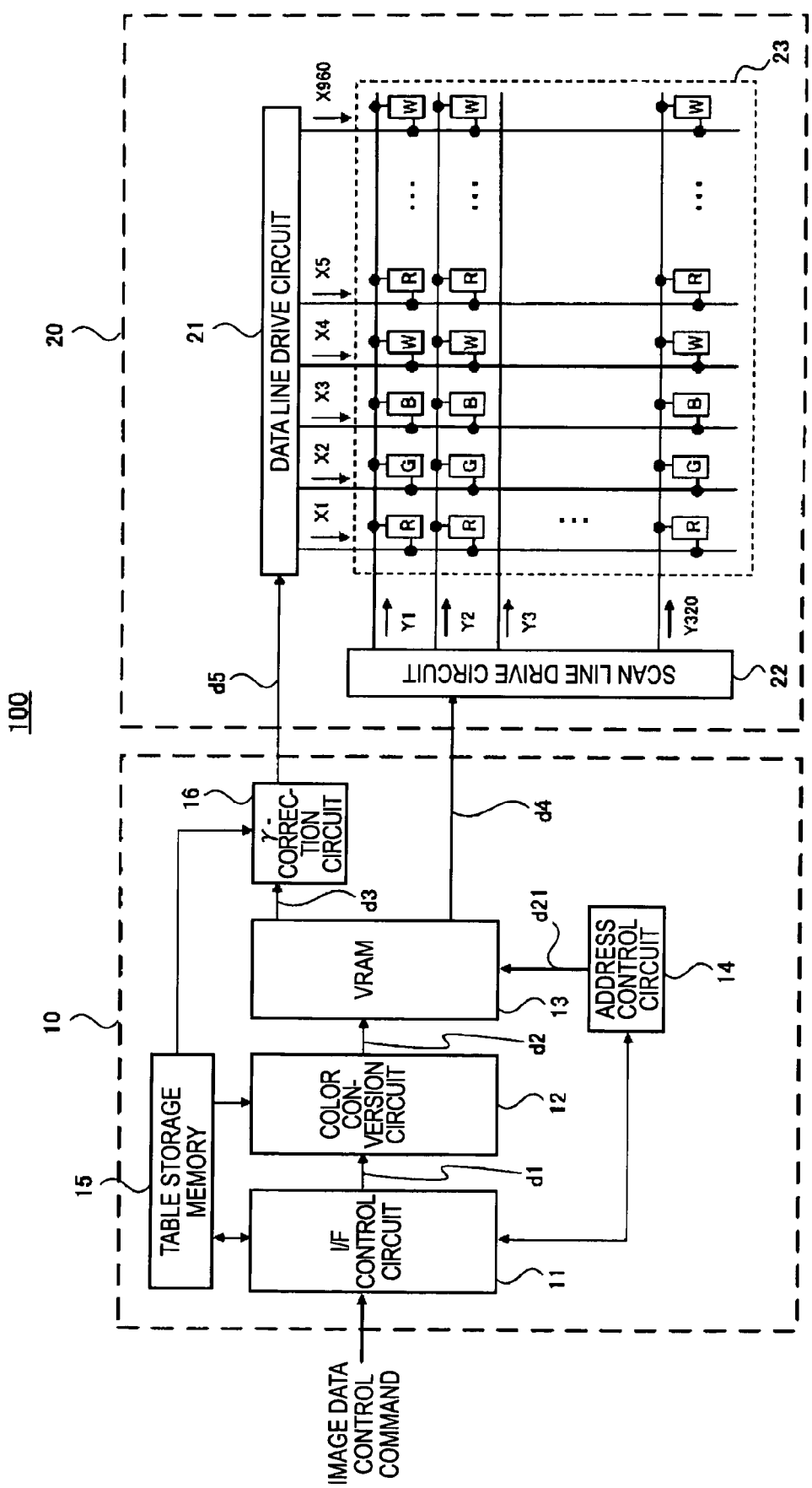
FIG. 1 is a block diagram showing a schematic configuration of an image display device according to an embodiment.

FIG. 1 is a block diagram showing a schematic configuration of an image display device 100 according to the embodiment. The image display device 100 includes an image processing unit 10 that externally acquires image data and control commands and performs image processing on the image data, and a display unit 20 that displays the image data image-processed in the image processing unit 10. The image display device 100 is arranged to display images using multiple colors (hereinafter, basic colors representing image data are also referred to as "primary colors"). Specifically, the image display device 10 is arranged to display images using four primary colors. Red, Green, Blue and White (hereinafter, the colors are also expressed simply as "R", "B", and "W").

The image processing unit 10 includes an I/F control circuit 11, a color conversion circuit 12, a VRAM (Video RAM) 13, an address control circuit 14, a table storage memory 15, and a γ-correction circuit 16.

The I/F control circuit 11 externally acquires image data and a control command (e.g., from a camera) and supplies image data d1 to the color conversion circuit 12. The color conversion circuit 12 mainly performs processing of color conversion from three primary colors to four primary colors on the acquired image data d1. Image data d2 image-processed in the color conversion circuit 12 is written in the VRAM 13. The image data d2 written in the VRAM 13 is read by the γ-correction circuit 16 as image data d3 based on a control signal d21 from the address control circuit 14. Simultaneously, an address signal d4 is supplied to a scan line drive circuit 22 within the display unit 20. Thereby, a data line drive circuit 21 and the scan line drive circuit 22 can drive a display panel 23 in synchronization with each other. Further, the γ-correction circuit 16 performs γ-correction on the acquired image data d3 based on correction data stored in the table storage memory 15. Then, the γ-correction circuit 16 supplies image data d5 after γ-correction to the data line drive circuit 21 within the display unit 20.

The display unit 20 includes the data line drive circuit 21, the scan line drive circuit 22, and the display panel 23. The data line drive circuit 21 supplies data line drive signals X1 to X960 to 960 data lines and supplies scan line drive signals Y1 to Y320 to 320 scan lines. Specifically, the scan line drive circuit 22 selects pixel rows in the lateral direction at a constant frequency, and the data line drive circuit 21 supplies corresponding drive signals to the respective pixel rows selected in the scan line drive circuit 22. In this case, the data line drive circuit 21 and the scan line drive circuit 22 drive the display panel 23 in synchronization with each other. The display panel 23 includes a liquid crystal (LCD) and etc., and displays images of characters and videos to be displayed when voltages are applied to the scan lines and data lines. Further, the display panel 23 is arranged to display the above mentioned four primary colors of RGBW.

Although the above mentioned VRAM 13 is an effective tool for low power consumption when the same display data is repeatedly displayed, the image display device 100 can be configured without using the VRAM 13 at the expense of low power consumption. In this case, the address control circuit 14 and the scan line drive circuit 22 are directly connected and the scan line drive circuit 22 and the data line drive circuit 21 are synchronized for display.

Further, although the display unit 20 is configured using the LCD in the above example, any display device other than the LCD can be used in the display unit for multi-primary color display. For example, in addition to the display devices for flat-panel display such as CRT, PDP, OLED, and FED, display devices for projection such as LCP and PTV may be used.

Figure 2:
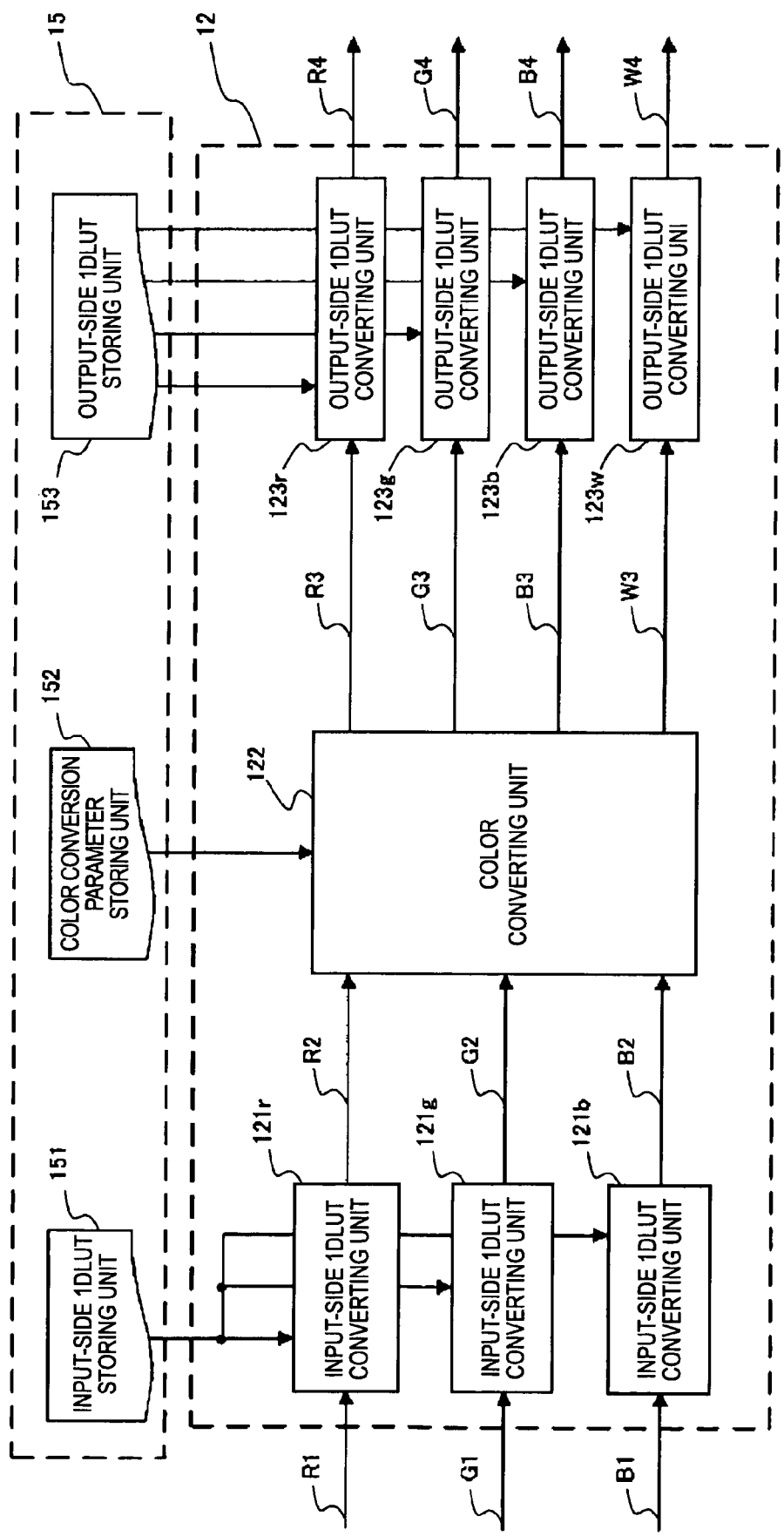
FIG. 2 is a block diagram showing a specific configuration of a color conversion circuit etc.

FIG. 2 is a block diagram showing a specific configuration of the above described color conversion circuit 12 and table storage memory 15. The color conversion circuit 12 includes input-side 1DLUT converting units 121$r$, 121$g$, and 121$b$, a color converting unit 122, and output-side 1DLUT converting units 123$r$, 123$g$, 123$b$, and 123$w$. Further, the table storage memory 15 includes an input-side 1DLUT storing unit 151, a color conversion parameter storing unit 152, and an output-side 1DLUT storing unit 153

The input-side 1DLUT converting units 121$r$ to 121$b$ perform γ-adjustment on input image data R1, G1, and B1 using 1DLUT stored in the input-side 1DLUT storing unit 151 thereinafter, referred to as "input-side 1DLUT"). The γ-adjustment is performed in this manner for linearization of the data because the input image data R1, G1, and B1 are usually γ-converted by a camera. The image data R1, G1, and B1 correspond to the above described image data d1. Further, the image data R1 corresponds to the primary color Red, the image data G1 corresponds to the primary color Green, and the image data B1 corresponds to the primary color Blue (hereinafter, signs with numerals attached to the "R", "G", "B", and "W" indicate data representing the above primary colors).

The color converting unit 122 uses color conversion parameters stored in the color conversion parameter storing unit 152 to perform color conversion on the image data R2, G2, and B2 processed in the input-side 1DLUT converting units 121$r$ to 121$b$ from the three primary colors into four primary colors. Specifically, the color converting unit 122 color-converts the image data from the three primary colors of RGB into four primary colors of RGBW with an additional color of white. In this case, the color converting unit 122 uses a table of output values corresponding to input values (hereinafter, referred to as "3DLUT") as color conversion parameters for conversion. The method of color conversion and the method of creating the 3DLUT will be described later in detail.

The output-side 1DLUT converting units 123$r$ to 123$w$ use 1DLUT stored in the output-side 1DLUT storing unit 153 hereinafter, referred to as "output-side 1DLUT" to perform γ-conversion on the image data R3, G3, B3, W3 processed in the color converting unit 122. The γ-adjustment is performed in this manner for returning the gamma that has been linearized for conversion with 3DLUT to the original gamma curve. Then, the output-side 1DLUT converting units 123$r$ to 123$w$ output the image data R4, G4, B4, W4 after output-side 1DLUT conversion to the above described VRAM 13. These image data R4, G4, B4, W4 correspond to the above described image data d2'

Color Conversion Device

Next, a color conversion device according to the embodiment will be described. In the embodiment, as described above, the processing of color-converting the input data of three primary colors of RGB into data of four primary colors of RGBW used by the display unit 20. The color conversion device creates the 3DLUT used when the color conversion is performed. In this case, the color conversion device creates the 3DLUT so that appropriate color compression and appropriate color reproduction may be performed when the RGB data is color-converted into the RGBW data. Hereinafter, the display device 20 is also simply referred to as "device". Further, the standard color space is assumed for input, the input is also referred to as "target" or "target color".

Figure 3:
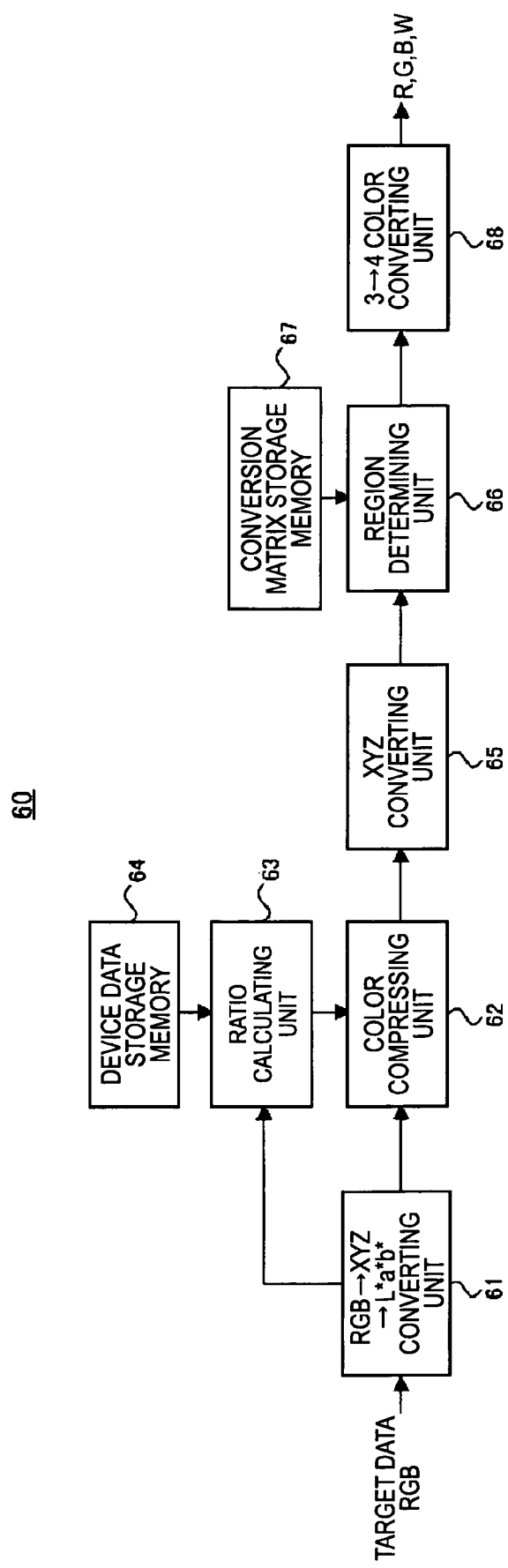
FIG. 3 is a block diagram showing a schematic configuration of a color conversion device.

FIG. 3 is a block diagram showing a schematic configuration of a color conversion device. The color conversion device 60 has an RGB→XYZ→L*a*b* converting unit 61, a color compressing unit 62, a ratio calculating unit 63, a device data storage memory 64, an XYZ converting unit 65, a region determining unit 66, a conversion matrix storage memory 67, and a 3→4 color converting unit 68. The color conversion device 60 may be incorporated in the above described color conversion circuit 12. In this case, the color converting unit 122 within the color conversion circuit 12 creates the 3DLUT and performs color conversion using it.

When the target color is input in RGB values, the RGB→XYZ→L*a*b* converting unit 61 performs processing of converting the RGB values into XYZ values and converting the XYZ values into L*a*b* values. The color compressing unit 62 performs processing of color-compressing data processed in the RGB→XYZ→L*a*b* converting unit 61 in the L*a*b* values. The ratio calculating unit 63 calculates a lightness ratio and a saturation ratio between the color reproduction range in RGB and the color reproduction range in colors used by the device from the L*a*b* values. Then, the ratio calculating unit 63 determines a compression ratio used for the above described color compression based on the calculated ratios. In this case the ratio calculating unit 63 refers to data of the device stored in the device data storage memory 64.

The XYZ converting unit 65 converts the L*a*b* values after processing in the color compressing unit 62 into XYZ values. The region determining unit 66 determines in which region the target color is, and determines a conversion matrix set for each region. In this case, the region determining unit 66 determines a conversion matrix by referring to the conversion matrix storage memory 67. The 3→4 color converting unit 68 performs processing of color conversion from three colors to four colors based on the conversion matrix determined in the region determining unit 66.

As described above, the color compressing unit 62 functions as color compressing means, the ratio calculating unit 63 functions as ratio calculating means, and the region determining unit 66 and the 3→4 color converting unit 68 function as converting means.

Method of Creating 3DLUT

Next, the method of creating 3DLUT according to the embodiment will be described in detail.

Figure 4:
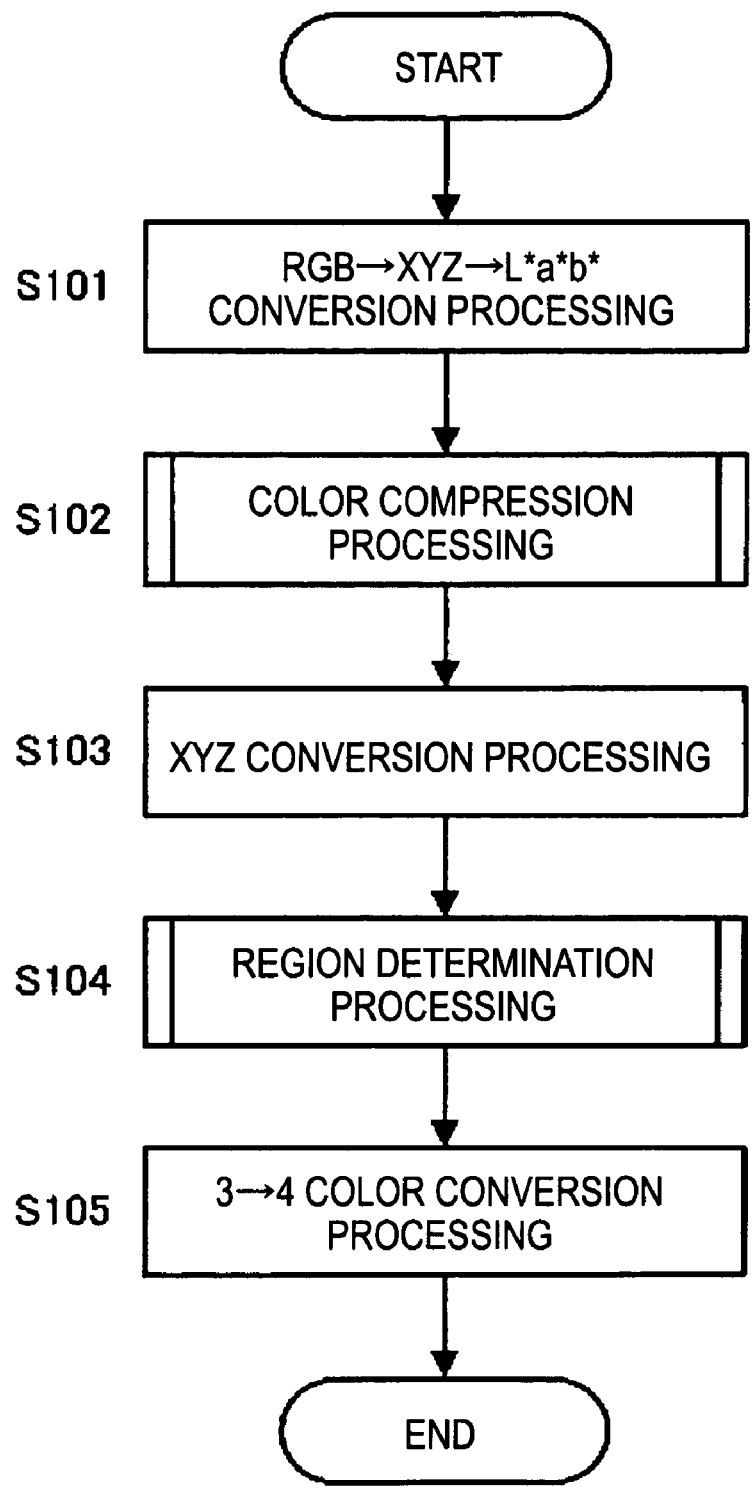
FIG. 4 is a flowchart showing processing of creating 3DLUT.

FIG. 4 is a flowchart showing processing of creating 3DLUT. This processing is executed by the above described color conversion device 60.

First, at step S101, the RGB→XYZ→L*a*b* converting unit 61 within the color conversion device 60 performs processing of converting the RGB values into XYZ values and converting the XYZ values into L*a*b* values. In this case, the RGB→XYZ→L*a*b* converting unit 61 normalizes the color reproduction range of the target to equalize the reproduction ranges of gray axes, and outputs the white of the device with higher brightness than that of the white of the target. Then, the process moves to step S102.

At step S102, the color compressing unit 62 within the color conversion device 60 executes color compression processing on the data processed in the RGB→XYZ→L*a*b converting unit 61. In this case, the color compressing unit 62 executes color compression processing based on the lightness ratio and the saturation ratio calculated by the ratio calculating unit 63. Then, the process moves to step S103.

At step S103, the XYZ converting unit 65 within the color conversion device 60 converts the L*a*b* values after processing in the color compressing unit 62 into XYZ values. Then, the process moves to step S104.

At step S104, the region determining unit 66 within the color conversion device 60 determines in which region the target color is, and determines a conversion matrix set for each region. Specifically, the region determining unit 66 executes processing of dividing the region in the color reproduction range (hereinafter, referred to as "region division processing") and processing of creating a conversion matrix for each region, and determining a conversion matrix for the target color (hereinafter, referred to as "conversion matrix creation processing"). After the above processing ends, the process moves to step S105.

At step S105, the 3→4 color converting unit 68 within the color conversion device 60 performs processing of color conversion from three colors to four colors based on the conversion matrix determined in the region determining unit 66. Then, the process comes out of the flow. The 3DLUT contains correspondences between the RGB values input at step S101 and the four-color (RGBW) data obtained by the color conversion at step S105.

As below, the details of the above described processing will be explained.

RGB→XYZ→L*a*b* Conversion Processing

Here, the RGB→XYZ→L*a*b* conversion processing will be described by referring to FIGS. 5 and 6.

The RGB→XYZ→L*a*b* conversion processing is executed by the RGB→XYZ→L*a*b* converting unit 61. The RGB→XYZ→L*a*b* converting unit 61 basically normalizes the color reproduction range of the target to equalize the reproduction ranges of gray axes and executes conversion. Thereby, the white of the device with higher brightness than that of the white of the target can be output.

FIGS. 5A and 5B are charts for explanation of a method of obtaining a matrix thereinafter, referred to as "RGB→XYZ conversion matrix") used for conversion from RGB values into XYZ values in the RGB→XYZ→L*a*b* conversion processing. FIG. 5A snows XYZ values of RGBW obtained from the device at the top and normalized XYZ values at the bottom. In the embodiment, the RGB→XYZ conversion matrix is expressed using the normalized XYZ values. FIG. 5B shows the RGB-XYZ conversion matrix obtained in this manner.

FIG. 6 shows an example of results from the RGB→XYZ→L*a*b* conversion processing. FIG. 6 shows the color space (RGB values) of the target at the left, results obtained when the RGB values are converted into XYZ values using the RGB→XYZ conversion matrix (the matrix shown in FIG. 5B) at the center, and results obtained when the XYZ values are converted into L*a*b* values at the right.

Color Compression Processing

Next, the color compression processing will be explained by referring to FIGS. 7 to 10.

The color compression processing is processing executed by the color compressing unit 62 for color compressing the data processed in the RGB→XYZ→L*a*b* converting unit 61 in L*a*b* values. The processing is executed for reducing colors that may not be reproduced and overlap in the device after color conversion. Since W is added, the color reproduction range in the device has a feature larger along the gray axis and smaller in the saturation direction than the color reproduction range in the target color. On this account, in the embodiment, the method of widening the color reproduction range of the target color in the gray axis direction and color compressing only the parts that may not be reproduced is used. As below, the method of reducing the color reproduction range of the target color to the degree that can be reproduced in the color reproduction range of the device will be specifically explained.

Figure 7:
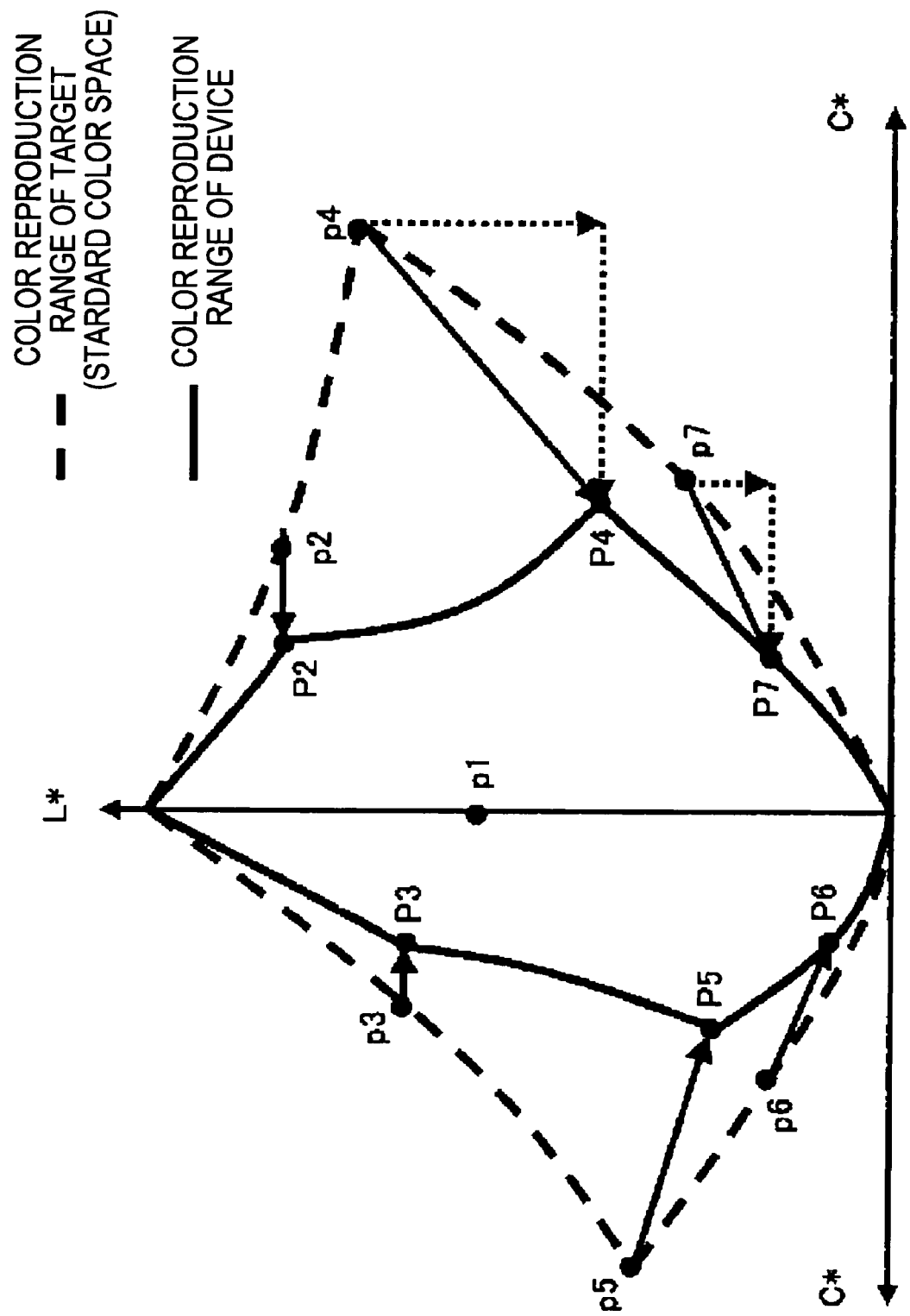
FIG. 7 is a diagram for explanation of color compression processing.

FIG. 7 is a diagram for explanation of the color compression processing. FIG. 7 shows the color reproduction range of the target in the L*a*b* space (corresponding to the standard color space, shown by broken lines in the drawing) and the color reproduction range of the device (shown by solid lines in the drawing). The graph shows L*a*b* space with the vertical axis indicating L* (lightness) and the horizontal axis indicating C* (saturation), and C* is calculated based on the square root of a* and b*. Specifically, the broken lines show the outermost surface of the color reproduction range of the target, and the solid lines show the outermost surface of the color reproduction range of the device. The device with colors to which white is added is characterized in that the range is smaller in the saturation direction as a whole and the lightness is lower in the part where the saturation is the highest (primary colors RGB or the like) compared to the target.

Here, in the color reproduction range in the L*a*b* space of the device, there is a part where the saturation becomes lower from the boundary at which the saturation is the highest toward the high lightness direction and the saturation becomes relatively lower in the higher lightness region than at the boundary (specifically, starts to drastically drop). In the XYZ space, the boundary at which the saturation becomes relatively lower is at the values obtained by adding the respective primary vectors and the white vector and converting them in L*a*b*. With the L* value as reference, the region where the lightness is higher is defined as "high lightness region". There are two points at which the saturation becomes relatively lower in the high lightness direction, and the high lightness region is defined by a point other than the point at which the saturation is the highest on the outermost surface.

In the embodiment, color components are determined before the color compression processing. Specifically, which point has which color component is checked in advance among points of LUT (see FIG. 6). If the check is impossible, the same coefficient may be used for all colors. Further, the points on the gray axis and the points. In the high lightness region are determined among the point of LUT. The points in the high lightness region refer to points on the outermost surface of the above described high lightness region. In FIG. 7, point p1 is a point on the gray axis, points p2, p3 are points in the high lightness region, and points p4 to p7 are points other than the points on the gray axis or the points in the high lightness region (hereinafter, also referred to as "other points").

The color compression processing is performed based on the above described determination result of color components. Specifically, regarding the point on the gray axis, color compression is not performed on all of L*a*b*. That is, the values without change are used. Regarding the points in the high lightness region, color compression is not performed on L*, but performed on a*b*. That is, color compression is performed only in the saturation direction. Further, regarding the other points, color compression is performed on L*a*b*. That is, color compression is performed both in the lightness direction and the saturation direction. Referring to FIG. 7, since the point p1 is the point on the gray point (i.e., on the L* axis), no change is made and the target values themselves are used. Since the points p2, p3 are the points in the high lightness region, the compression of L* is not performed and the color compression is performed only in the saturation direction, so that the points are changed to points P2, P3, respectively. Further, since the points p4 to p7 are the other points, color compression is performed in the lightness direction and the saturation direction, so that the points are changed to points P4 to P7, respectively.

In addition, the above described color compression is basically performed based on a lightness ratio and a saturation ratio between the color reproduction range in RGB (the color reproduction range in the standard color space) and the color reproduction range in colors used by the device, and the ratios are calculated from L*a*b* values. Specifically, the color compression is performed by multiplying the data representing lightness by the lightness ratio as a coefficient and multiplying the data representing saturation by the saturation ratio as a coefficient. That is, using the lightness ratio and the saturation ratio as compression ratios, the color compression is separately performed on the data representing lightness and the data representing saturation, respectively.

Figure 8:
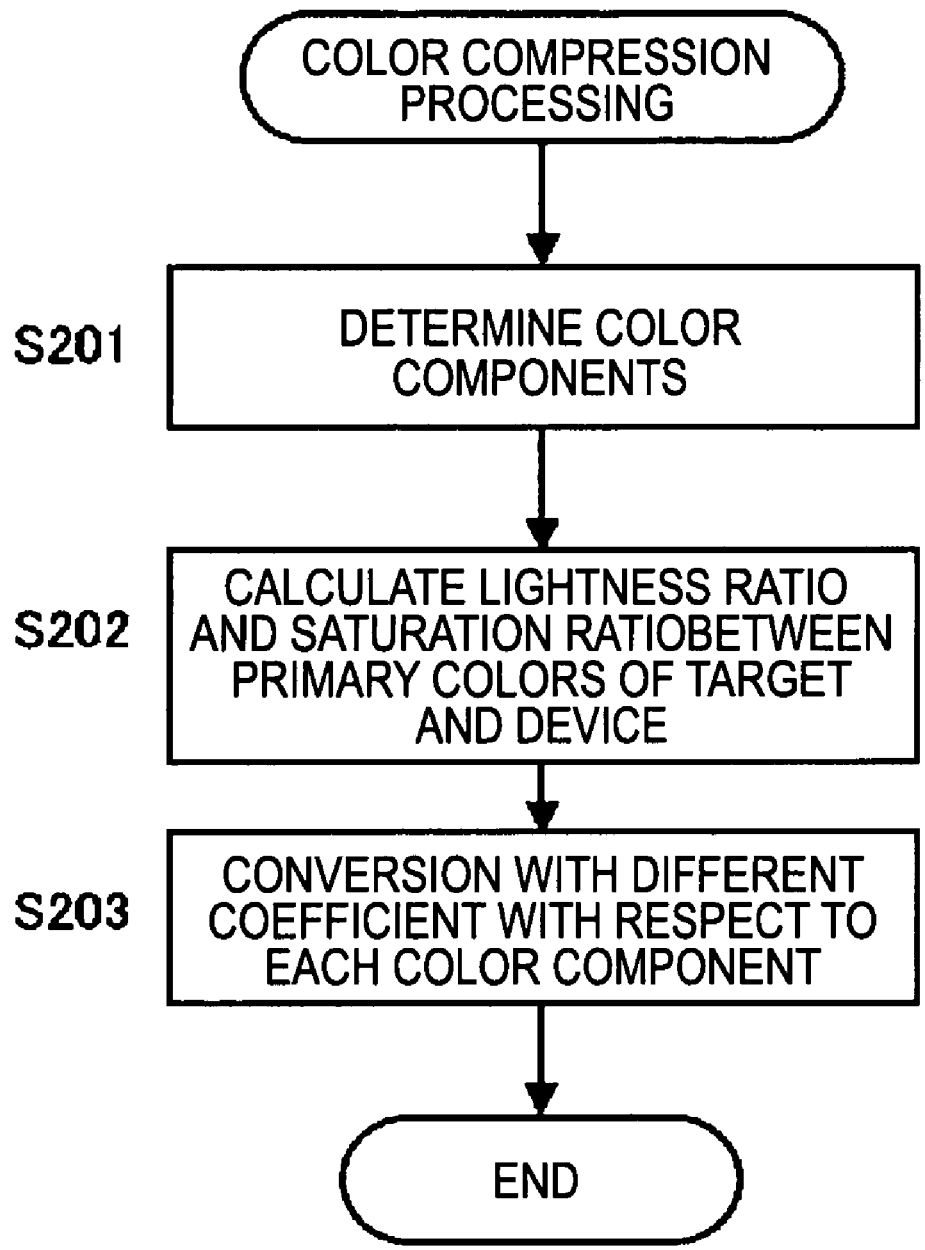
FIG. 8 is a flowchart showing the color compression processing.

FIG. 8 is a flowchart showing the color compression processing. The processing is executed by the color compressing unit 62 and the ratio calculating unit 63 within the color conversion device 60.

First, at step S201, the color compressing unit 62 determines color components. Specifically, the unit checks which point has which color component in advance among points of LUT (see FIG. 6). If the check is impossible, the same coefficient may be used for all colors. Further, the unit determines the points on the gray axis, the points in the high lightness region, and other points among the points of LUT. Then, the process moves to step S202.

At step S202, the ratio calculating unit 63 calculates a lightness ratio and a saturation ratio between the primary colors of the target and the device. That is, the ratio calculating unit 63 calculates the saturation ratio, and calculates the lightness (L*) ratio between the target and the device with respect to each primary color in L*a*b* space. These ratios are used as compression ratios for color compression. When the coefficients of RGB are determined, CMY of the color mixture ("C" denotes cyan, "M" denotes magenta, and "Y" denotes yellow) are calculated as average values using the RGB coefficients (CMY may be obtained in the same manner as that of RGB from the device values). Regarding colors other than RGBCMY, the compression ratios of RGBCMY are calculated by linear interpolation with respect to each color component. Further, when the color is in the halfway to the point not to be compressed, linear interpolation is performed with the compression ratio "1". After the above described processing ends, the process moves to step S203.

At step S203, the color compressing unit 62 performs conversion (color compression) with different coefficients with respect to each color component. That is, the color compressing unit 62 multiplies a* and b* by the saturation ratio as a coefficient and multiplies L* by the lightness ratio as a coefficient. Since the coefficients are determined with respect to each primary color, the coefficients for multiplication are determined according to the respective color components (when the intermediate tones are outside of the color reproduction range, the compression ratios may be different between the middle part and the outermost surface). By the color compression, conversion providing no color overlapping but smooth gradation can be performed. If the high saturation inside is desired though some overlapping occurs, multiplication of a value higher than the ratios calculated at step S202 may be performed for color compression. After the above processing ends, the process comes out of the flow.

According to the above described color compression processing, even when the color space in the device may not encompass most of the color space of the target, compression can be performed without color overlapping. For example, the colors outside of the color reproduction range can be appropriately reproduced. Furthers since the color compressor is performed in the L*a*b* space, the compression suitable for human visual perception can be performed. Furthermore, in the above described color compression processing, the compression ratios can be changed according to the hues and gradations as well.

Next, an example of the result from the color compression processing will be explained by referring to FIGS. 9A, 9B, and 10.

FIGS. 9A and 9B show compression ratios with respect to each primary color used when the color compression processing is executed. FIG. 9A shows types of points of LUT used when the color components are determined. In this case, the point corresponding to number "I" indicates a point as an apex of the color reproduction range, the point corresponding to number "II" indicates a point that forms the intermediate part, the point corresponding to number "III" indicates a point on the gray axis, and the point corresponding-g to number "IV" indicates a point in the high lightness region. When the color components are determined in the above described processing at step S201, the point of LUT is classified into one of the numbers "I" to "IV". The points corresponding to the numbers "I" and "II" correspond to the above described "other points". FIG. 9B shows compression ratios respectively used for L* and a* and b* with respect to each point of numbers "I" to "IV". In this case, the compression ratio is set with respect to each primary color.

Figure 10:
FIG. 10 shows an example of the result from the color compression processing.
Figure 10:

FIG. 10 shows an example of the result from the color compression processing. FIG. 10 shows L*a*b* values obtained by RGB→XYZ→L*a*b* conversion processing (they are the same as those shown in FIG. 6) at the left, settings of compression ratios corresponding to the numbers "I" to "IV" by determining color components and classifying points of LUT into any of the numbers at the center, and results from color compression based on the compression ratios at the right.

XYZ Conversion Processing

Next, XYZ conversion processing will be explained. The XYZ conversion processing is executed by the XYZ converting unit 65 for converting the L*a*b* values after processing in the color compressing unit 62 into XYZ values. The conversion into XYZ values is for region determination processing in the subsequent process.

Figure 11:
FIG. 11 shows an example of the result from XYZ conversion processing.

FIG. 11 shows an example of the result from the XYZ conversion processing. FIG. 11 shows L*a*b* values obtained by color compression processing (they are the same as those shown in FIG. 10) at the left, and results from XYZ conversion processing on the L*a*b* values at the right.

Region Determination Processing

Next, region determination processing will be explained by referring to FIGS. 12 to 18. The region determination processing is executed by the region determining unit 66. The processing determines in which region the target color is, and determines a conversion matrix set for each region.

Figure 12:
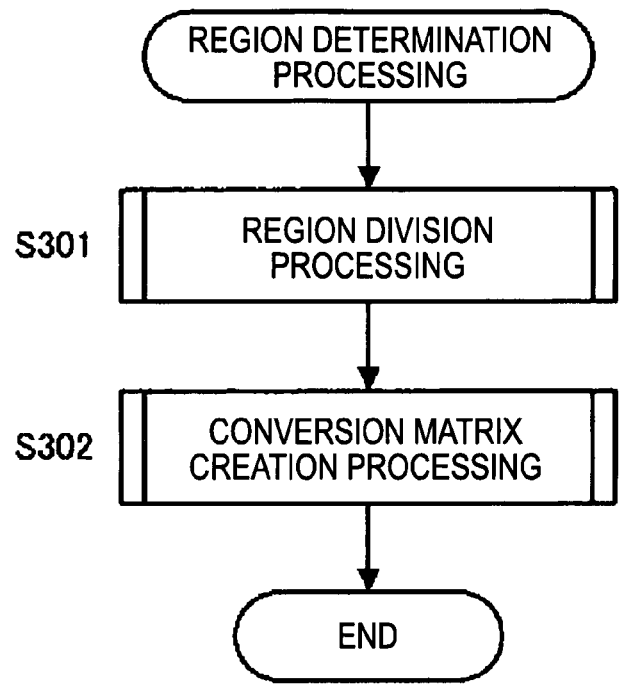
FIG. 12 is a flowchart slowing region determination processing.

FIG. 12 is a flowchart showing region determination processing. The processing is executed by the region determining unit 66.

First, at step S301, the region determining unit 66 executes region division processing. Specifically, the region determining unit 66 execute processing of dividing regions in the color reproduction range. Then, the process moves to step S302.

At step S302, the region determining unit 66 executes conversion matrix creation processing. Specifically, the region determining unit 66 creates a conversion matrix with respect to each region, and executes processing of determining a conversion matrix used for the target color. Then, the process comes out of the flow.

As below, the above described region division processing and conversion matrix creation processing will be explained in detail.

Region Division Processing

In region division processing, plural combinations split up from three elements (RGB) into four elements (RGBW) are conceivable, and thus, the color reproduction range is divided into regions that can be represented by 3→3 elements. That is, three elements are split up into three elements under a constrained condition that one of four elements is set to "0" or two elements are changed at the same time.

Figure 13:
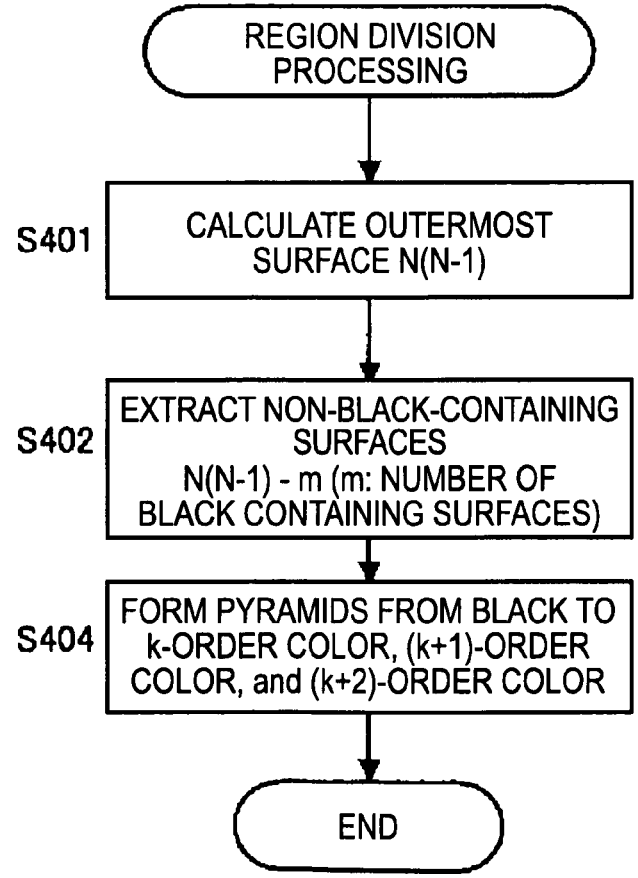
FIG. 13 is a flowchart showing region division processing.

FIG. 13 is a flowchart showing region division processing. The processing is executed by the region determining unit 66 at step S301 of the process shown in FIG. 12.

First, at step S401, the region determining unit 66 calculates the outermost surface of the color reproduction range in the device using RGBW four primary colors. In this case, the number of faces on the outermost surface is "N(N−1)" for N primary colors. Then, the process moves to S402.

At step S402, the region determining unit 66 extracts non-black-containing faces. In this case, the color reproduction range is divided into pyramids with apexes of black, and thus the black-containing faces are not divided as bottom sides of the pyramids. Assuming that the number of black containing faces is m, the number of non-black-containing faces is "N(N−1)−m". Then, the process moves to step S403.

At step S403, the region determining unit 66 forms pyramids for dividing the color reproduction range. The non-black-containing faces extracted at step S402 are expressed as a k-order color, (two) (k+1)-order colors, and a (k+2)-order color. The k-order color is a color formed by adding k primary colors. The pyramid formed by drawing a line from the corresponding point to black is one divided region. After the above described processing ends, the process comes out of the flow.

Figure 14B:
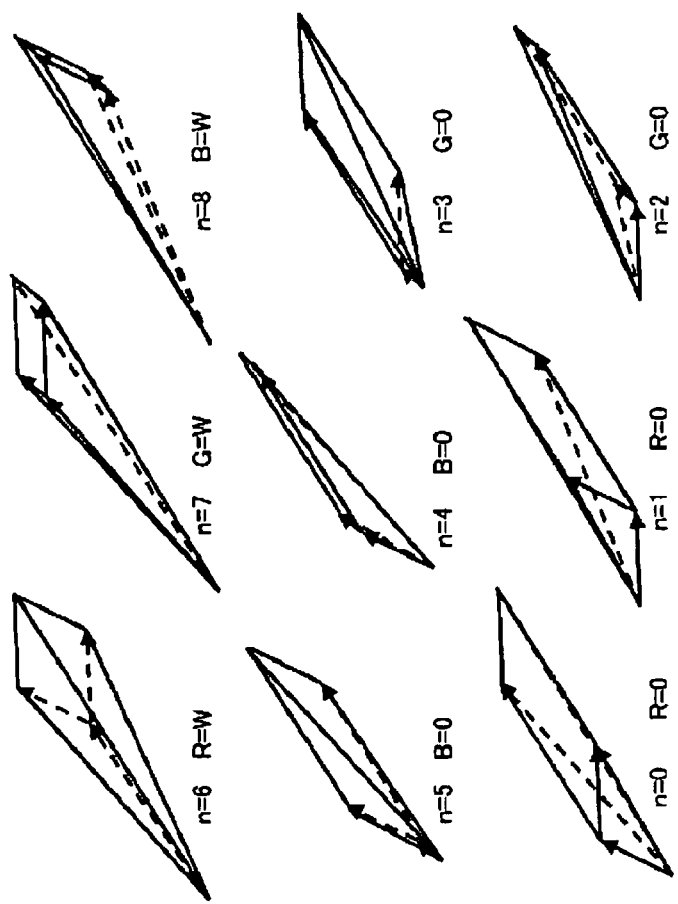
FIGS. 14A and 14B show an example of the result from the region division processing.
Figure 14A:
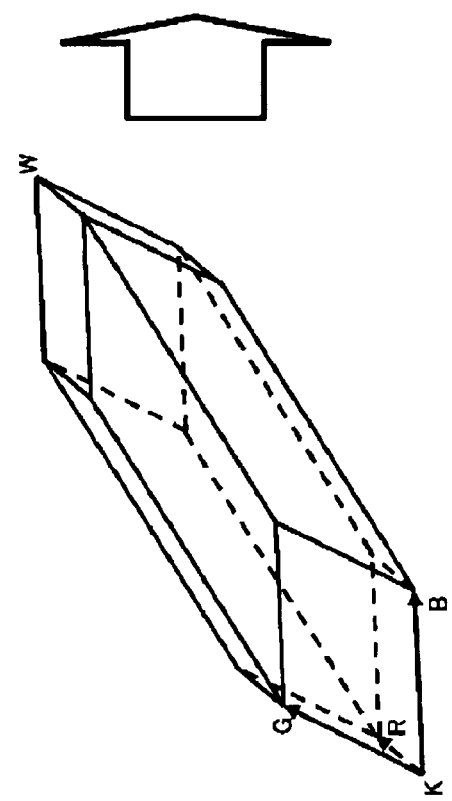

FIGS. 14A and 14B show an example of the result from the region division processing. FIG. 14A shows a color reproduction range in the device, and FIG. 14B shows pyramids formed by dividing the color reproduction range. Since the color reproduction range is "N(N−1)-hedron", as shown in FIG. 14A, the color reproduction range of the device using four primary colors is "4×3=12-hedron". In this case, there are three black-containing faces and nine non-black-containing faces, and thereby, the region is divided into nine parts as shown in FIG. 14B. If the color reproduction range containing W is divided, some regions under the same restraint condition are formed.

Conversion Matrix Creation Processing

In conversion matrix creation processing, a conversion matrix is created for each of the regions divided in the above described manner. First, using a conversion matrix of equation (1), some points of XYZ corresponding to RGBC are calculated with respect to each region, and a conversion matrix from XYZ to RGBC is obtained with approximate values.

$$\begin{pmatrix} R \\ G \\ B \\ C \end{pmatrix} = M \begin{pmatrix} X \\ Y \\ Z \end{pmatrix} \quad \text{Equation (1)}$$

From equation (1), conversion matrix M set for each region can be obtained. Here, if one region is selected, its conversion matrix can be obtained from RGBC values and XYZ values because the value of the apex of the region is an apex on the outermost surface. Given that the input matrix of matrix number n is $M_{XYZn}$, the output is $M_{RGBCn}$, and the conversion matrix is $M_n$, the equation (1) is replaced by the following equation (2)

$$M_{RGBCn} M_n M_{XYZn} \quad \text{Equation (2)}$$

Further, the conversion matrix $M_n$ can be derived as equation (3) and determined. That is, the conversion matrix $M_n$ can be created by calculating a pseudo-inverse matrix with respect to each region.

$$M_{RGBCn} M_{XYZn}{}^t = M M_{XYZn} M_{XYZn}{}^t$$

$$M_n = M_{RGBCn} M_{XYZn}{}^t (M_{XYZn} M_{XYZn}{}^t)^{-1} \quad \text{Equation (3)}$$

Figure 15:
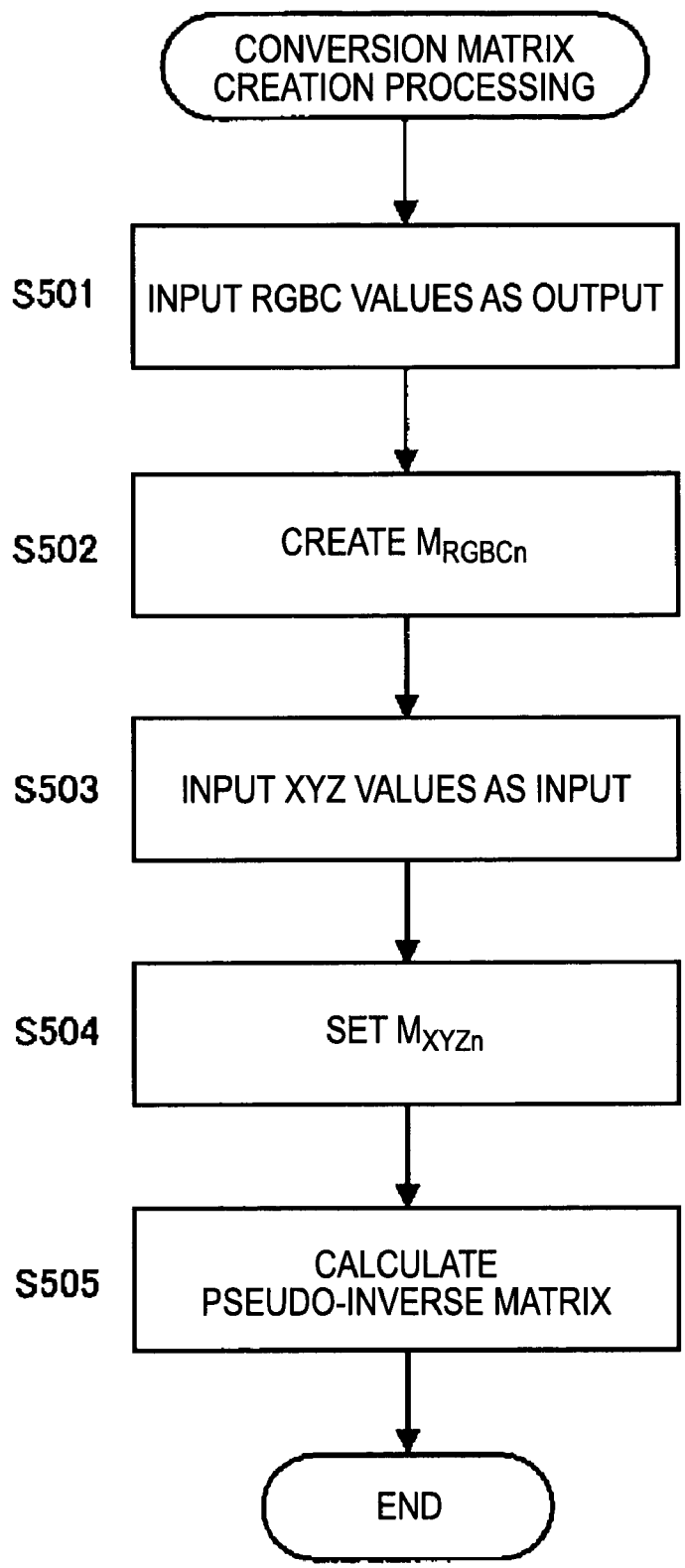
FIG. 15 is a flowchart showing conversion matrix creation processing.

FIG. 15 is a flowchart showing conversion matrix creation processor. The processing is executed by the region determining unit 66 at step S302 of the process shown in FIG. 12.

First, at step S501, the region determining unit 66 inputs RGBC values as output. Then, the process moves to S502. At step S502, the region determining unit 66 creates the matrix $M_{RGBCn}$ based on the RGBC values input at step S501. Then, the process moves to S503.

At step S503, the region determining unit 66 inputs XYZ values as input. Then, the process moves to S504. At step S504, the region determining unit 66 sets the matrix $M_{XYZn}$ based on the XYZ values input at step S503. In this case, the primary color XYZ values are used in the device using RGBW four colors. Then, the process moves to S505.

At step S505, the region determining unit 66 calculates the pseudo-inverse matrix (see the equations (3) created from the above described equation (1). That is, conversion matrixes $M_0$ to $M_8$ are calculated by substituting values of apexes in the color reproduction range to equations (3). For example, the conversion matrix $M_0$ set for the region n=0 (the region shown at the lower left in FIG. 14B) is calculated as expressed by the following equation (4).

$$M_0 = M_{RGBC0} M_{XYZ0}^t (M_{XYZ0} M_{XYZ0}^t)^{-1} \quad \text{Equation (4)}$$

$$= \begin{pmatrix} 0 & 0 & 0 & 0 \\ 0 & 1 & 1 & 1 \\ 0 & 0 & 0 & 1 \\ 0. & 0 & 1 & 0 \end{pmatrix} \begin{pmatrix} 0 & 0.1653 & 0.6933 & 0.2361 \\ 0 & 0.3228 & 0.8898 & 0.3512 \\ 0 & 0.0319 & 0.5462 & 0.3863 \end{pmatrix}^t$$

$$\left( \begin{pmatrix} 0 & 0.1653 & 0.6933 & 0.2361 \\ 0 & 0.3228 & 0.8898 & 0.3512 \\ 0 & 0.0319 & 0.5462 & 0.3863 \end{pmatrix} \right)$$

$$\begin{pmatrix} 0 & 0.1653 & 0.6933 & 0.2361 \\ 0 & 0.3228 & 0.8898 & 0.3512 \\ 0 & 0.0319 & 0.5462 & 0.3863 \end{pmatrix}^{t-1}$$

$$= \begin{pmatrix} 0 & 0 & 0 & 0 \\ 0 & 1 & 1 & 1 \\ 0 & 0 & 0 & 1 \\ 0 & 0 & 1 & 0 \end{pmatrix} \begin{pmatrix} 0 & 0 & 0 \\ 0.1633 & 0.3228 & 0.0319 \\ 0.6933 & 0.8898 & 0.5462 \\ 0.2361 & 0.3512 & 0.3863 \end{pmatrix}^t$$

$$\left( \begin{pmatrix} 0 & 0.1653 & 0.6933 & 0.2361 \\ 0 & 0.3228 & 0.8898 & 0.3512 \\ 0 & 0.0319 & 0.5462 & 0.3863 \end{pmatrix}^{-1} \right.$$

$$\left. \begin{pmatrix} 0 & 0 & 0 \\ 0.1653 & 0.3228 & 0.319 \\ 0.6933 & 0.8898 & 0.5462 \\ 0.2361 & 0.3512 & 0.3863 \end{pmatrix}^{t-1} \right)$$

$$= \begin{pmatrix} 0 & 0 & 0 \\ 1.0948 & 1.5638 & 0.9645 \\ 0.2361 & 0.3512 & 0.3863 \\ 0.6933 & 0.8898 & 0.5462 \end{pmatrix}$$

$$\begin{pmatrix} 166.3859 & -105.1015 & -23.9508 \\ -108.1015 & 77.9932 & 4.6295 \\ -23.9508 & 4.6295 & 21.0771 \end{pmatrix}$$

$$= \begin{pmatrix} 0.000 & 0.000 & 0.000 \\ -9.994 & 8.084 & 1.347 \\ -7.933 & 3.656 & 4.113 \\ 6.087 & -3.022 & -0.974 \end{pmatrix}$$

FIGS. 16A to 16I show results of calculation of the conversion matrixes $M_0$ to $M_8$ with respect to each of the nine regions divided as described above. FIGS. 16A to 16I show the conversion matrixes $M_0$ to $M_8$ and matrixes $M_{RGBC0}$ to $M_{RGBC8}$ used when the conversion matrixes $M_0$ to $M_8$ are obtained. After the conversion matrixes $M_0$ to $M_8$ are created in this manner, the process comes out of the flow.

The same conversion matrix is set for the regions under the same constraint condition. For example, the region of "n=0" and the region of "n=1" are under the same constraint condition "R=0", and thus, the conversion, matrix $M_0$ and the conversion matrix $M_1$ are the same (see FIG. 16). Similarly, the conversion matrix $M_2$ and the conversion matrix $M_3$ are the same, and the conversion matrix $M_4$ and the conversion matrix $M_5$ are the same. Therefore, the number of matrixes actually used is six. In the embodiment, which regions contain points corresponding to LUT is determined in advance, and conversion matrixes used for the respective points are determined for calculation. FIG. 17 shows an example of a chart in which points corresponding to LUT are associated with conversion matrixes $M_0$ to $M_8$ used for the respective points.

Figure 18:
FIG. 18 shows an example of the result from 3→4 color conversion processing.

FIG. 18 shows an example of the result from 3→4 color conversion processing using the above described conversion matrixes $M_0$ to $M_8$. The 3→4 color conversion processing is executed by the 3→4 color converting unit 68. Specifically, the processing is performed for color conversion of XYZ values obtained by the XYZ conversion processing from three colors into four colors based on the conversion matrixes $M_0$ to $M_8$ determined by the region determining unit 66.

FIG. 18 shows XYZ values obtained by the XYZ conversion processing and the conversion matrixes $M_0$ to $M_8$ used for the respective XYZ values at the left, and results from color conversion of the XYZ values from three colors into four colors at the right.

Modified Example

The operation performed in the above described processes is basically, assumed to be performed by a circuit, however, the operation may be performed by software processing. For example, the function that the color conversion device 60 has can be realized by a color conversion program to be executed by a CPU (computer). The color conversion program may be stored in a hard disk or ROM in advance, or externally supplied by a computer-readable recording medium such as a CD-ROM and the color conversion program read by a CD-ROM drive may be stored in a hard disk.

The entire disclosure of Japanese Patent Application No. 2006-318065, filed Nov. 27, 2006 is expressly incorporated by reference herein.

What is claimed is:

1. A color conversion device that color-converts colors of input image data into colors used in a display unit for displaying images using at least white, the device, implemented as a suitably programmed processor or as a circuit, comprising:
   a ratio calculating unit that calculates a lightness ratio and a saturation ratio between a color reproduction range in a standard color space and a color reproduction range in colors used by the display unit in L*a*b* space at least when a color outside of the color reproduction range in colors used by the display unit is calculated; and
   a color compressing unit that performs color compression on the image data based on the ratios calculated by the ratio calculating unit;
   wherein the color compressing unit color-compresses data representing lightness in the image data based on the lightness ratio and color-compresses data representing saturation in the image data based on the saturation ratio;
   wherein the color compressing unit color-compresses only the data representing saturation and does not color-compress the data representing lightness for colors in a high lightness region, does not color-compress either the data representing lightness or the data representing saturation for colors on a gray axis, and color-compresses both the data representing lightness and the data representing saturation for colors other than the colors in the high lightness region or the colors on the gray axis; and
   wherein the high lightness region is defined based on a point at which the saturation is lower in a high lightness direction, other than a point at which the saturation is the highest in each hue in the L*a*b* space.

2. The color conversion device according to claim 1, wherein the color compressing unit performs the color compression by multiplying the data representing lightness by the lightness ratio as a coefficient and multiplying the data representing saturation by the saturation ratio as a coefficient.

3. The color conversion device according to claim 1, further comprising a converting unit that sets a conversion matrix with respect to each color reproduction range divided into plural regions in the display unit, determines in which region of the plural regions the image data after color compression by the color compressing unit is, and converts the image data based on the conversion matrix set for the determined region.

4. The color conversion device according to claim 1, wherein the display unit provides display using Red, Green, Blue, and White.

5. A color conversion method implemented on a suitably programmed processor, that color-converts colors of input image data into colors used in a display unit for displaying images using at least white, the method comprising:

calculating a lightness ratio and a saturation ratio between a color reproduction range in a standard color space and a color reproduction range in colors used by the display unit in L*a*b* space at least when a color outside of the color reproduction range in colors used by the display unit is calculated; and performing color compression on the image data based on the ratios calculated by the ratio calculating unit;

wherein the color compressing unit color-compresses data representing lightness in the image data based on the lightness ratio and color-compresses data representing saturation in the image data based on the saturation ratio;

wherein the color compressing unit color-compresses only the data representing saturation and does not color-compress the data representing lightness for colors in a high lightness region, does not color-compress either the data representing lightness or the data representing saturation for colors on a gray axis, and color-compresses both the data representing lightness and the data representing saturation for colors other than the colors in the high lightness region or the colors on the gray axis; and wherein the high lightness region is defined based on a point at which the saturation is lower in a high lightness direction, other than a point at which the saturation is the highest in each hue in the L*a*b* space.

6. A non-transitory computer-readable recording medium that records a color conversion program that color-converts colors of input image data into colors used in a display unit for displaying images using at least white, the program allow a computer to function as:

a ratio calculating unit that calculates a lightness ratio and a saturation ratio between a color reproduction range in a standard color space and a color reproduction range in colors used by the display unit in L*a*b* space at least when a color outside of the color reproduction range in colors used by the display unit is calculated; and a color compressing unit that performs color compression on the image data based on the ratios calculated by the ratio calculating unit;

wherein the color compressing unit color-compresses data representing lightness in the image data based on the lightness ratio and color-compresses data representing saturation in the image data based on the saturation ratio;

wherein the color compressing unit color-compresses only the data representing saturation and does not color-compress the data representing lightness for colors in a high lightness region, does not color-compress either the data representing lightness or the data representing saturation for colors on a gray axis, and color-compresses both the data representing lightness and the data representing saturation for colors other than the colors in the high lightness region or the colors on the gray axis: and wherein the high lightness region is defined based on a point at which the saturation is lower in a high lightness direction, other than a point at which the saturation is the highest in each hue in the L*a*b* space.

* * * * *